(12) United States Patent
Waterstredt et al.

(10) Patent No.: US 9,771,955 B2
(45) Date of Patent: Sep. 26, 2017

(54) SYSTEM AND METHOD FOR FAST FILL OF ACCUMULATOR FOR AUTOMATIC TRANSMISSIONS

(71) Applicant: BorgWarner Inc., Auburn Hills, MI (US)

(72) Inventors: Jeffrey J. Waterstredt, Royal Oak, MI (US); Christopher Spangler, Rochester Hills, MI (US); Jason Nienstedt, Macomb, MI (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 15/333,625

(22) Filed: Oct. 25, 2016

(65) Prior Publication Data

US 2017/0130740 A1    May 11, 2017

Related U.S. Application Data

(60) Provisional application No. 62/251,766, filed on Nov. 6, 2015, provisional application No. 62/253,245, filed on Nov. 10, 2015.

(51) Int. Cl.
*B60W 10/04* (2006.01)
*F15B 1/033* (2006.01)
*F16H 61/00* (2006.01)

(52) U.S. Cl.
CPC ......... *F15B 1/033* (2013.01); *F16H 61/0021* (2013.01); *F16H 2061/0034* (2013.01)

(58) Field of Classification Search
CPC ................. F15B 1/033; F16H 61/0021; F16H 2061/0034
See application file for complete search history.

(56) References Cited

U.S. PATENT DOCUMENTS

| | | | | |
|---|---|---|---|---|
| 5,810,694 A | * | 9/1998 | Kamada | F16H 61/0021 477/117 |
| 7,798,941 B2 | * | 9/2010 | Bai | F16D 48/066 477/174 |
| 9,090,241 B2 | * | 7/2015 | Otanez | B60W 10/115 |
| 2011/0263381 A1 | * | 10/2011 | Katou | F16H 61/0021 477/115 |
| 2013/0261910 A1 | * | 10/2013 | Ichikawa | F16H 61/0021 701/58 |
| 2014/0033845 A1 | * | 2/2014 | Kamada | F16H 61/061 74/336 R |

* cited by examiner

*Primary Examiner* — David J Hlavka
(74) *Attorney, Agent, or Firm* — Howard & Howard Attorneys PLLC

(57) ABSTRACT

A system and method for fast fill of a hydraulic accumulator used in an automatic transmission includes providing an active fast fill mechanism fluidly connected to a hydraulic accumulator and a hydraulic system of the automatic transmission, providing an electronic control module in communication with the active fast fill mechanism, activating, by the electronic control module, the active fast fill mechanism to allow the hydraulic accumulator to fill with fluid from the hydraulic system, filling, by the active fast fill mechanism, the hydraulic accumulator with fluid, and de-activating, by the electronic control module, the active fast fill mechanism to stop filling the hydraulic accumulator with fluid from the hydraulic system during stop/start engine events of a vehicle.

17 Claims, 2 Drawing Sheets

SYSTEM AND METHOD FOR FAST FILL OF ACCUMULATOR FOR AUTOMATIC TRANSMISSIONS

CROSS-REFERENCE TO RELATED APPLICATION(S)

The present application claims the benefit of U.S. Provisional Patent Application No. 62/251,766, filed Nov. 6, 2015 and U.S. Provisional Patent Application No. 62/253,245, filed Nov. 10, 2015, the entire disclosures of both are hereby incorporated by reference.

BACKGROUND OF INVENTION

1. Field of Invention

The present invention relates generally to automatic transmissions and, more specifically, to a system and method for fast fill of an accumulator for an automatic transmission.

2. Description of the Related Art

Conventional vehicles known in the art typically include an engine having a rotational output as a rotational input into a transmission such as an automatic transmission. The engine generates the rotational output which is selectively translated to the transmission which, in turn, translates rotational torque to one or more wheels. The transmission changes the rotational speed and torque generated by the engine through a series of predetermined gearsets, whereby changing between the gearsets enables a vehicle to travel at different vehicle speeds for a given engine speed.

In addition to changing between the gear sets, the automatic transmission is also used to modulate engagement with the rotational output of the engine, whereby the transmission can selectively control engagement with the rotational output of the engine so as to facilitate vehicle operation. By way of example, torque translation between the rotational output of the engine and the input into the automatic transmission is typically interrupted while the vehicle is parked or idling, or when the transmission changes between the gearsets. In conventional automatic transmissions, modulation is achieved via a hydrodynamic device such as a hydraulic torque converter. However, modern automatic transmissions may replace the torque converter with one or more electronically and/or hydraulically actuated clutches (sometimes referred to in the art as a "dual clutch" automatic transmission). Automatic transmissions are typically controlled using hydraulic fluid and a hydraulic system including a pump assembly, a valve body having one or more solenoid valves, and an electronic controller. The pump assembly provides a source of fluid power to the solenoid valves of the valve body which, in turn, are actuated by the controller so as to selectively direct hydraulic fluid throughout the automatic transmission to control modulation of rotational torque generated by the rotational output of the engine. The solenoid valves are also typically used to change between the gear sets of the automatic transmission, and may also be used to control hydraulic fluid used to cool and/or lubricate various components of the transmission in operation.

It is known to provide a hydraulic accumulator to store hydraulic fluid for the hydraulic system used in the automatic transmission. Generally, the hydraulic accumulator fluidly communicates with the valve body of the hydraulic system of the automatic transmission. Typically, the pump assembly is turned on to provide enough hydraulic fluid and pressure to meet the needs of the automatic transmission, for example, providing enough hydraulic fluid to clutches of the automatic transmission. However, this approach is more expensive and results in more power consumption to fill the hydraulic accumulator.

In addition, the hydraulic accumulator must be coordinated with an engine restart event. A launch clutch of the automatic transmission must be filled before the engine produces output torque. This approach to refilling the hydraulic accumulator means that after an engine restart event, it may take several seconds to refill the hydraulic accumulator to allow for the next engine stop event. This is not desirable to a vehicle driver who may be in a slow traffic jam or at a drive-through line.

Accordingly, it is desirable to assist an automatic transmission in stop/start vehicle applications by actively filling and controlling a discharge of the accumulator when commanded. It is also desirable to provide a control strategy or method to allow for near instantaneous refill of the hydraulic accumulator under specific conditions. Thus, there is a need in the art to provide a system and method for fast fill of the hydraulic accumulator for an automatic transmission.

SUMMARY OF THE INVENTION

The present invention provides a system for fast fill of a hydraulic accumulator for an automatic transmission including a hydraulic accumulator adapted to be fluidly connected with a hydraulic system of the automatic transmission and an active fast fill mechanism fluidly connected to the hydraulic accumulator and adapted to be fluidly connected to the hydraulic system to allow hydraulic fluid from the hydraulic system to the hydraulic accumulator. The system also includes a passive slow fill mechanism in parallel to the active fast fill mechanism and fluidly connected to the hydraulic accumulator and adapted to be fluidly connected to the hydraulic system of the automatic transmission and an electronic control module communicating with the active fast fill mechanism for activating the fast fill mechanism to fast fill the hydraulic accumulator during stop/start engine events of a vehicle.

In addition, the present invention provides a method for fast fill of a hydraulic accumulator for an automatic transmission including the steps of providing an active fast fill mechanism fluidly connected to a hydraulic accumulator and a hydraulic system of the automatic transmission, providing an electronic control module in communication with the active fast fill mechanism, and activating, by the electronic control module, the active fast fill mechanism to allow the hydraulic accumulator to fill with fluid from the hydraulic system. The method also includes the step of filling, by the active fast fill mechanism, the hydraulic accumulator with fluid, and de-activating, by the electronic control module, the active fast fill mechanism to stop filling the hydraulic accumulator with fluid from the hydraulic system during stop/start engine events of a vehicle.

One advantage of the present invention is that a system and method is provided for fast fill of a hydraulic accumulator for an automatic transmission during stop/start engine events of a vehicle. Another advantage of the present invention is that the system and method controls a hydraulic accumulator with a fast fill mechanism such as a two-way solenoid valve to allow fast fill of the hydraulic accumulator of a hydraulic system for the automatic transmission. Yet another advantage of the present invention is that the system and method may bypass a passive slow-fill mechanism of the hydraulic system by actively opening the solenoid valve to fast fill the hydraulic accumulator. Still another advantage of the present invention is that the system and method allows for faster filling of the hydraulic accumulator during stop/start engine events of the vehicle.

Other objects, features, and advantages of the present invention will be readily appreciated as the same becomes better understood after reading the subsequent description taken in connection with the accompanying drawings.

DETAILED DESCRIPTION OF THE INVENTION

Figure 1:
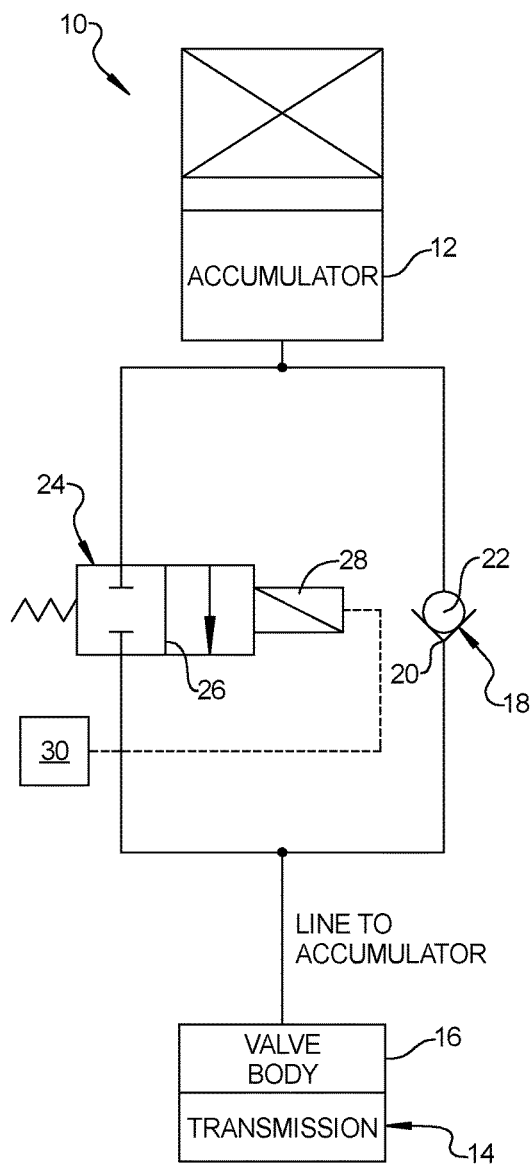
FIG. 1 is a schematic view of one embodiment of a system, according to the present invention, for fast fill of a hydraulic accumulator for an automatic transmission.

Referring now to the figures, where like numerals are used to designate like structure unless otherwise indicated, a system 10, according to one embodiment of the present invention, is shown for fast filling a hydraulic accumulator 12 used in conjunction with an automatic transmission, generally indicated at 14 in FIG. 1, for a vehicle (not shown). The vehicle includes an engine (not shown) that cooperates with the automatic transmission 14. The engine generates rotational torque which is selectively translated to the automatic transmission 14 which, in turn, translates rotational torque to one or more wheels (not shown) of the vehicle. It should be appreciated that the engine and the automatic transmission 14 are of the type employed in a "hybrid" vehicle having engine stop/start events. It should also be appreciated that the engine and/or automatic transmission 14 could be of any suitable type, configured in any suitable way sufficient to generate and translate rotational torque so as to drive the vehicle, without departing from the scope of the present invention.

The automatic transmission 14 includes a hydraulic system having a pump (not shown) and a valve body 16 with a plurality of valves (not shown) that control fluid flow and fluid pressure from the pump in the automatic transmission 14. The hydraulic accumulator 12 fluidly communicates with the valve body 16 to remove hydraulic fluid and pressure fluctuations in the hydraulic system and to deliver hydraulic fluid to the hydraulic system to provide sufficient transmission line pressure to the automatic transmission 14. In one embodiment, the hydraulic accumulator 12 includes a housing having storage, a movable piston disposed in the housing, and a spring biasing the piston. It should be appreciated that the hydraulic accumulator 12 and automatic transmission 14 are known in the art.

In one embodiment, the system 10 may include a passive slow fill mechanism, generally indicated at 18, disposed in a fluid line between the hydraulic accumulator 12 and the valve body 16 to fill the accumulator 12 at a relatively slow rate in order to ensure that the hydraulic or transmission line pressure does not sag (run low) due to a flow demand to fill the hydraulic accumulator 12. In one embodiment, the passive slow fill mechanism 18 includes a passive restriction 20 with a check ball 22. It should be appreciated that this passive slow fill mechanism 18 allows for slow refill of the hydraulic accumulator 12, for example 3-10 seconds, after an engine restart event and allow the next engine stop event.

The system 10 includes an active fast fill mechanism, generally indicated at 24, disposed in the fluid line between the hydraulic accumulator 12 and the valve body 16 and in parallel with the passive slow fill mechanism 18 to fill the hydraulic accumulator 12 at a relatively fast rate. In one embodiment, the active fast fill mechanism 24 is a two-way solenoid valve having a movable valve member 26 and a solenoid 28 to actuate or move the valve member 26. It should be appreciated that the active fast fill mechanism 24 allows for near instantaneous refill of the hydraulic accumulator 12, for example in less than one second, after a restart event of the engine. It should also be appreciated that the valve member 26 opens and closes the fluid flow in the fluid line from the valve body 16 to the hydraulic accumulator 12.

The system 10 further includes an electronic controller 30 in electrical communication with the fast fill mechanism 24 for active control. In one embodiment, the electronic controller 30 is in electrical communication with the solenoid 28 to activate or energize the solenoid 28 to actuate the valve member 26 or to deactivate or de-energize the solenoid 28 to de-actuate the valve member 28 to actively control fluid flow to and from the hydraulic accumulator 12. It should be appreciated that the electronic controller 30 is known in the art.

The present invention also provides a control strategy for the system 10 to allow for near instantaneous refill of the hydraulic accumulator 12 under specific conditions. For example, if the engine of the vehicle re-starts after an engine stop event and then immediately requests an engine stop event but the hydraulic accumulator 12 is not yet full, the solenoid 28 of the fast fill mechanism 24 is energized by the electronic controller 30 to allow the hydraulic accumulator 12 to fill in less than one second. The solenoid 28 is then de-energized by the electronic controller 30 and the engine of the vehicle can be shut-off. It should be appreciated that this can only be done in conditions where transmission line pressure sag is not an issue, for example, when the vehicle has come to a stop with the foot of the operator on the brake. It should also be appreciated that, in this case, there is no risk to slip a clutch of the automatic transmission 14 if the transmission line pressure sages while filling the hydraulic accumulator 12.

Figure 2:
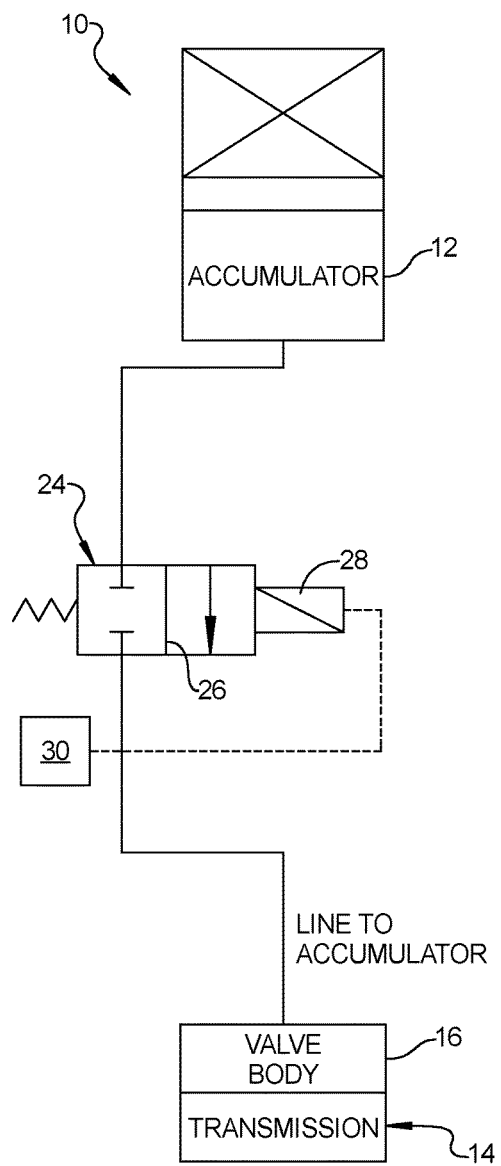
FIG. 2 is a schematic view of another embodiment of a system, according to the present invention, for fast fill of a hydraulic accumulator for an automatic transmission.

Referring to FIG. 2, another embodiment, according to the present invention, of the system 10 is shown. Like parts of the system 10 of FIG. 1 has like reference numerals. As illustrated in FIG. 2, the system 10 eliminates the passive slow fill mechanism in parallel with the active fast fill mechanism 24 and has no strategy to passively fill the hydraulic accumulator 12. In this embodiment, the system 10 can fill the hydraulic accumulator 12 actively under accommodating conditions to simplify control algorithms used to calculate how full the hydraulic accumulator 12 is and minimize the amount of time that the transmission line pressure is raised solely for the purpose of filling the hydraulic accumulator 12. It should be appreciated that the fluid line for the passive slow fill mechanism is also eliminated.

In the past, strategies for filling the hydraulic accumulator 12 assume that passive filling requires zero or minimal additional energy to fill. However, because the fully stroked pressure of the hydraulic accumulator 12 can be in the range of 8 to 14 bar and typical transmission line pressure commands in the automatic transmission 14 may only be 4 to 8 bar in normal operation, the control algorithm typically includes periods of "line boost" to complete the filling of the hydraulic accumulator 12. When transmission line pressure is boosted, total leakage of the valve body 16 increases and the energy to fill the hydraulic accumulator 12 is no longer "free".

EXAMPLE

Standard passive fill with boost to complete fill (50% of accumulator volume)

$50 \text{ cm}^3 \cdot (12-5)\text{bar} = 35 \text{ J}$ — Boost to complete last 50% of accumulator fill $1\frac{L}{\min} \cdot 5 \text{ s} \cdot (12-5)\text{bar} = 58.333 \text{ J}$ — Additional valve body leak during boost.

$35 \text{ J} + 58.333 \text{ J} = 93.333 \text{ J}$ — Total energy cost for boosting to fill Active fill with lower boost and time to complete fill (100% of accumulator volume)

$100 \text{ cm}^3 \cdot 9 \text{ bar} = 90 \text{ J}$ — Energy cost to active fill accumulator $0.5\frac{L}{\min} \cdot 0.5 \text{ s} \cdot (9-5)\text{bar} = 1.667 \text{ J}$ — Additional valve body leak during boost.

$90 \text{ J} + 1.667 \text{ J} = 91.667 \text{ J}$ — Total energy cost for boosting to fill As shown in the above example, the total energy consumed to actively fill the hydraulic accumulator 12 may be less than that required to passively fill the hydraulic accumulator 12 with a boosted transmission line pressure command.

Figure 3:
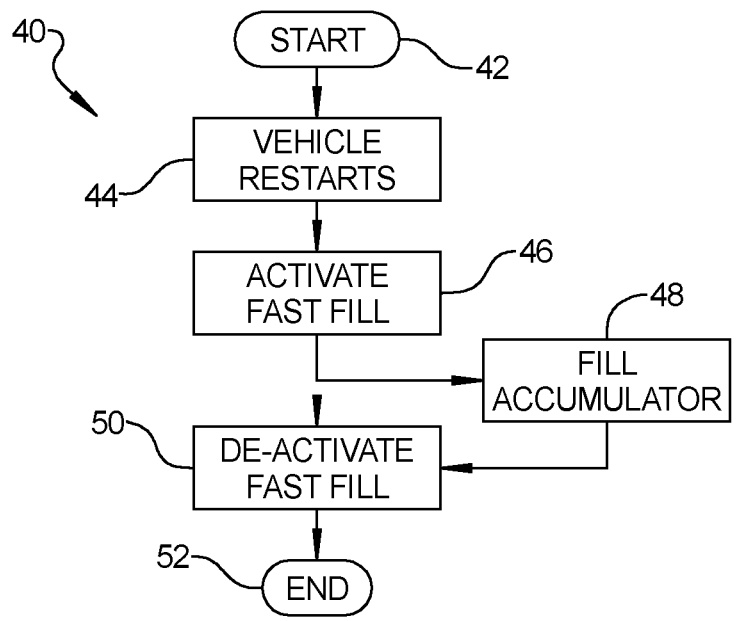
FIG. 3 is a flowchart of one embodiment of a method, according to the present invention, for fast fill of a hydraulic accumulator for an automatic transmission for use with the system of FIG. 1 or 2.

Referring to FIG. 3, one embodiment of a method, according to the present invention, for fast fill of the hydraulic accumulator 12 using the system 10 is shown at 40. The method 40 starts at block 42 and advances to block 44 for a vehicle engine restart event. In block 44, the electronic controller 30 receives a signal that the engine of the vehicle is restarting. The method 40 advances to block 46 and activates the fast fill mechanism 24. In block 46, the electronic controller 30 energizes the solenoid 28 to move the valve member 26f and allow fluid flow from the fast fill mechanism 24 to the hydraulic accumulator 12. The method 40 then advances to block 48 and fills the hydraulic accumulator 12. In block 48, when the solenoid 28 is energized, the valve member 26 opens fluid flow from the valve body 16 to the hydraulic accumulator 12 and fills the hydraulic accumulator 12. The method 40 advances to block 50 and de-activates the fast fill mechanism 24. In block 50, once the hydraulic accumulator 12 is filled, the electronic controller 30 de-energizes the solenoid 28 to move the valve member 26 and stop fluid flow from the fast fill mechanism 24 to the hydraulic accumulator 12. The method then advances to block 52 and ends.

Figure 4:
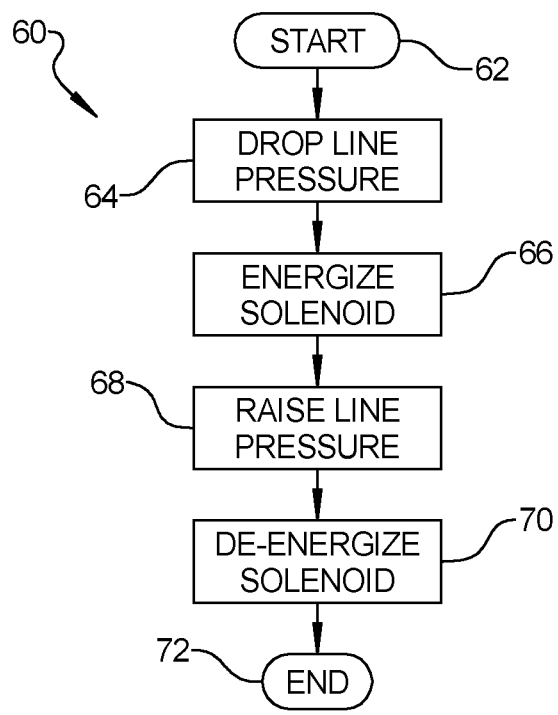
FIG. 4 is a flowchart of another embodiment of a method, according to the present invention, for fast fill of a hydraulic accumulator for an automatic transmission for use with the system of FIG. 1 or 2.

Referring to FIG. 4, one embodiment of a method, according to the present invention, for energizing and de-energizing the solenoid 28 of a solenoid valve for the fast fill mechanism 24 is shown at 60. The method 60 starts at block 62 and advances to block 64 to drop the transmission line pressure in the hydraulic system. In block 64, the electronic controller 30 energizes the solenoid 28 to move the valve member 26 and drop the transmission line pressure such that the transmission line pressure is not greater than a predetermined value such as 5 bar above the current pressure of the hydraulic accumulator 12. The method 60 advances to block 66 and energizes the solenoid 28. In block 66, the electronic controller 30 energizes the solenoid 28 to move the valve member 26 and allow fluid flow from the fast fill mechanism 24 to the hydraulic accumulator 12. The method 60 then advances to block 68 and raises the transmission line pressure. In block 68, the fast fill mechanism 24 fills the hydraulic accumulator 12 and the transmission line pressure is raised within a predetermined range such as 1-5 bar above the end of stroke pressure of the hydraulic accumulator 12 for sufficient time to fill the hydraulic accumulator 12. The method 60 advances to block 70 and de-energizes the solenoid 28. In block 70, once the transmission line pressure is raised, the electronic controller 30 de-energizes the solenoid 28 to move the valve member 26 and stop fluid flow to the hydraulic accumulator 12. The electronic controller 30 issues a drop line pressure command and initiates an engine shut-down routine for the engine of the vehicle. The method then advances to block 72 and ends.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the invention may be practiced other than as specifically described.

What is claimed is:

1. A system for fast fill of a hydraulic accumulator used in an automatic transmission, said system comprising:
   a hydraulic accumulator adapted to be fluidly connected with a hydraulic system of the automatic transmission;
   an active fast fill mechanism fluidly connected to said hydraulic accumulator and adapted to be fluidly connected to the hydraulic system of the automatic transmission to allow hydraulic fluid from the hydraulic system to said hydraulic accumulator;
   a passive slow fill mechanism in parallel to said active fast fill mechanism and fluidly connected to said hydraulic accumulator and adapted to be fluidly connected to the hydraulic system of the automatic transmission; and
   an electronic control module communicating with said active fast fill mechanism for activating said active fast fill mechanism to fast fill said hydraulic accumulator during stop/start engine events of a vehicle.

2. A system as set forth in claim 1 wherein said active fast fill mechanism is a solenoid valve.

3. A system as set forth in claim 2 wherein said solenoid valve is a two-way solenoid valve.

4. A system as set forth in claim 1 wherein said passive slow fill mechanism comprises a check valve.

5. A system as set forth in claim 4 wherein said check valve comprises a restriction and a ball check.

6. A method for fast fill of a hydraulic accumulator for an automatic transmission, said method comprising the steps of:
   providing an active fast fill mechanism fluidly connected to a hydraulic accumulator and a hydraulic system of the automatic transmission;
   providing an electronic control module in communication with the active fast fill mechanism;

activating, by the electronic control module, the active fast fill mechanism to allow the hydraulic accumulator to fill with fluid from the hydraulic system;

filling, by the active fast fill mechanism, the hydraulic accumulator with fluid; and de-activating, by the electronic control module, the active fast fill mechanism to stop filling the hydraulic accumulator with fluid from the hydraulic system during stop/start engine events of a vehicle.

7. A method as set forth in claim 6 wherein the step of providing the active fast fill mechanism includes providing a solenoid valve having a movable valve member and a solenoid for moving the valve member.

8. A method as set forth in claim 7 wherein the step of activating includes energizing, by the electronic control module, the solenoid of the solenoid valve to allow the hydraulic accumulator to fill with fluid from the hydraulic system.

9. A method as set forth in claim 8 wherein the step of energizing includes the step of dropping line pressure such that the line pressure is not greater than a predetermined amount above a current pressure of the hydraulic accumulator prior to energizing the solenoid.

10. A method as set forth in claim 8 wherein the step of filling the hydraulic accumulator includes the step of raising the line pressure.

11. A method as set forth in claim 10 wherein the step of filling the hydraulic accumulator includes the step of raising the line pressure from one to five bar above the end of stroke pressure for the hydraulic accumulator for a sufficient time to fill the hydraulic accumulator.

12. A method as set forth in claim 10 wherein the step of de-activating comprises de-energizing, by the electronic control module, the solenoid of the solenoid valve.

13. A method as set forth in claim 12 wherein said step of de-energizing includes dropping the line pressure.

14. A method as set forth in claim 13 including the step of initiating an engine shut-down routine.

15. A method as set forth in claim 6 including the step of receiving, by the electronic control module, a signal that the vehicle engine restarts after an engine stop event and immediately requests an engine stop event.

16. A system for fast fill of a hydraulic accumulator used in an automatic transmission, said system comprising:

a hydraulic accumulator adapted to be fluidly connected with a hydraulic system of the automatic transmission;

an active fast fill mechanism fluidly connected to said hydraulic accumulator and adapted to be fluidly connected to the hydraulic system of the automatic transmission to allow hydraulic fluid from the hydraulic system to said hydraulic accumulator; and an electronic control module communicating with said active fast fill mechanism for activating said active fast fill mechanism to fast fill said hydraulic accumulator during stop/start engine events of a vehicle.

17. A system as set forth in claim 16 including a passive slow fill mechanism in parallel to said active fast fill mechanism and fluidly connected to said hydraulic accumulator and adapted to be fluidly connected to the hydraulic system of the automatic transmission.

* * * * *